J. S. & T. B. Atterbury.
Glass Mold.
N° 89,005.  Patented Apr. 20, 1869.
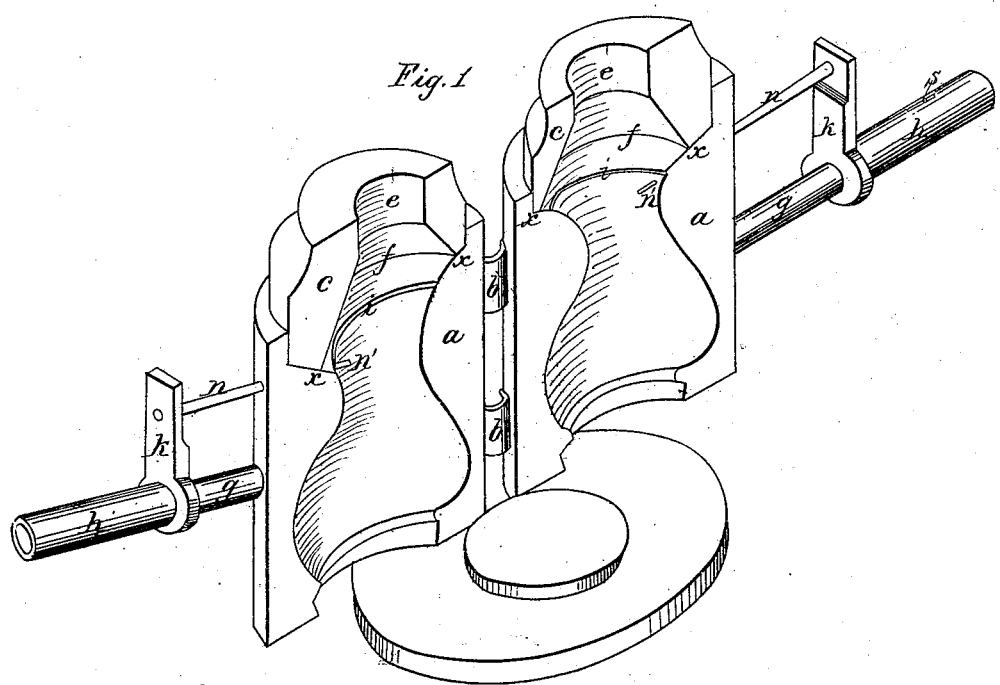
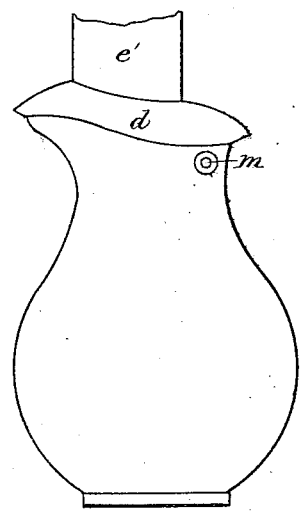
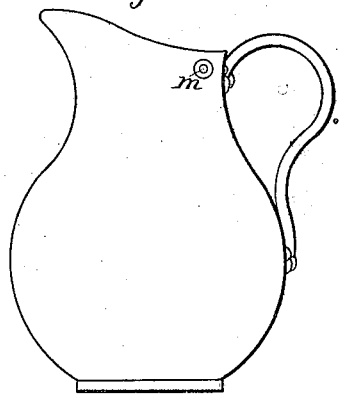
Witnesses
R. C. Wrenshall
Thos. B. Kerr
Inventors
James S Atterbury
Thomas B Atterbury
by their attorneys
Bakewell & Christy

J. S. ATTERBURY AND T. B. ATTERBURY, OF PITTSBURG, PENNSYLVANIA.

Letters Patent No. 89,005, dated April 20, 1869.

IMPROVEMENT IN THE MANUFACTURE OF GLASS-WARE.

The Schedule referred to in these Letters Patent and making part of the same.

*To all whom it may concern:*

Be it known that we, J. S. ATTERBURY and T. B. ATTERBURY, of the city of Pittsburg, in the county of Allegheny, and State of Pennsylvania, have invented a new and useful Improvement in the Manufacture of Glass-Ware; and we do hereby declare the following to be a full, clear, and exact description thereof, reference being had to the accompanying drawing, forming part of this specification, in which—

Figure 1 is a perspective representation of our improved mould for making ewer-mouthed pitchers.

Figure 2 represents a glass ewer-mouthed pitcher as it comes from the mould, before the "blow-over" is detached.

Figure 3 represents the pitcher prepared to receive its metallic cover or cap.

Like letters are employed to indicate similar parts.

Previous to the date of our invention it was found to be impracticable to make ewer-mouthed vessels of glass, by blowing them in a mould, which would form the ewer-mouth, or lip, as well as the body of the vessel.

The advantage to be derived from making such articles in a mould is, the forming of the upper edge, or rim of a definite curved shape, so that a metallic cap, or cover, of corresponding shape, will fit closely on to the naked glass edge, or rim.

Owing to this practical difficulty of making by hand a glass ewer-mouthed vessel of sufficiently regular shape to fit a metallic cap, glass pitchers which were required to be covered were made with a cylindrical neck, to which a separate top-piece was attached, by cement, or otherwise, such top-piece consisting of the rim and ewer-mouth, or lip, with a hinged cover.

We have succeeded in making ewer-mouthed glass pitchers with such exactness and uniformity that metallic caps can be attached thereto, so as to shut down on to the naked glass rim, and make a close joint.

For such articles, Letters Patent of the United States having been granted to us already, we propose in this specification to describe the construction and operation of the moulds which we use, and by means of which we are enabled to blow ewer-mouthed glass vessels with a definitely-shaped rim.

To enable others skilled in the art to construct and use our invention, we will proceed to describe it particularly.

In the drawing, fig. 1, $a\ a$ are the two halves of a mould used for making ewer-mouthed vessels, which halves are united by hinges, $b\ b$, in the usual way, and when closed, they form a cavity, or matrix, in which the ewer-mouthed vessel is formed, by blowing the glass within it.

There is nothing peculiar in the lower parts of the mould, (marked $a\ a$,) which are made in the ordinary way, excepting as to the shape of the upper portion of the cavity, it being a new thing, as before stated, in the art of glass-making, to form a ewer-mouthed glass vessel by blowing in a mould, owing to the difficulty of giving a uniform thickness to the glass all around the rim, or a slight excess of thickness in the ewer-mouth, or lip.

This we accomplish by means of the peculiar construction of the cavity of the upper part, $c\ c$, of the mould, which is above the rim of the pitcher in which the "blow-over" $d$, (see fig. 2,) is formed, and by placing the neck $e$, or opening in the mould through which the glass is inserted and blown to one side of the centre or axial line of the mould, and over the ewer-mouthed portion of the cavity $f$.

When glass is blown in a mould, the further it has to travel from the point at which it is inserted the thinner it becomes, as it is distended more than the other parts. Hence, if a ewer-mouthed vessel were blown in a mould of ordinary construction, the lip or ewer mouth extending further from the centre, would be so much thinner than the sides as to destroy the usefulness of the article.

In our improved mould, the neck or mouth $e$ of the mould is placed to one side of the centre or axial line, as is seen in fig. 2, from the position of the piece of glass $e'$, which is formed in the neck $e$ of the mould.

In order to secure the requisite thickness of glass along and all around the rim of the glass pitcher or vessel to be made, a shoulder, or projection, $i$, is formed in the mould, which projects over or on to the rim of the pitcher or vessel made in the mould. This shoulder $i$ is of the exact shape and curvature to be given to the top or rim of the pitcher.

Above this shoulder $i$, the cavity $c\ c$ of the mould rapidly widens for a short distance, (to the point $x$, in fig. 1,) and thence as rapidly contracts, to the dimensions of the neck $e$ of the mould.

The effect of this construction is that the glass inserted in the cavity of the mould, when it rises to the shoulder $i$, is arrested in its upward progress, and becomes a little thicker at that point all around the rim than it otherwise would be, were it not for the shoulder $i$. The glass then passing over the slight obstruction presented by the shoulder $i$, spreads out into the cavity $c\ c$, and forms the "blow-over" $d$, (seen in fig. 2,) of a comparatively thin film of glass, so that when it is desired to remove the "blow-over," a slight stroke will cause it to break off close to the rim of the pitcher, along the line formed by the shoulder $i$ in the mould, without danger of fracturing the pitcher.

The rim of the pitcher is thus definitely shaped, so that a metallic cover will fit it, the edge of the glass, left rough by breaking off the "blow-over," being ground smooth, without altering the shape or contour given by the shoulder $i$.

We will now proceed to describe the device which we employ in connection with our improved mould for making indentations in the glass at the points where holes are to be perforated, for the insertion of rivets, fo fastening the metallic hinged cover to ewer-mouthed pitchers.

On each of the handles $g\ g$, of the two half moulds $a\ a$, we place a sleeve, $h$, which has a short motion on the handle $g$, the length of which motion is regulated by a pin, $s$, projecting from the handle $g$, through a slot of proper length in the sleeve $h$.

To the inner end of the sleeve $h$ is fastened a bracket, $k$, to which is attached (parallel to the handle $g$) a rod, $n$, the point of which passes through the mould, entering its cavity at the proper point for making the rivet-holes in the glass, as seen in fig. 1, the same attachment being made to each of the half moulds $a\ a$.

When the glass is blown in the mould, the points $n'$, of the rods $n$, project sufficiently far into the cavity of the mould for the glass to form a thin film over the point of the rod, leaving an indentation, $m$, in the glass.

When the glass pitcher is to be removed from the mould, the sleeves $h$ are drawn back, so as to withdraw the points $n'\ n'$ from the cavity of the mould, and thus the points are prevented from injuring the glass, or unduly enlarging the indentations.

By these means we are enabled to produce a nicer and better article than can be made in any of the methods previously known, not only, but are enabled to accomplish what has heretofore been found impracticable.

What we claim as our invention, and desire to secure by Letters Patent, is—

1. A mould for blowing ewer-mouthed glass vessels, so constructed that the axis of the neck or mouth of the mould shall be situate forward of the centre or axial line of the main cavity, and over that part of the mould in which the ewer-mouth is formed.

2. A mould for forming ewer-mouthed glass vessels, furnished with a shoulder, $i$, and flaring blow-over recess, substantially as described, for the purposes set forth.

3. Blowing ewer-mouthed glass vessels in a mould, constructed substantially as hereinbefore described, and for the purposes set forth.

4. The movable points $n'$, entering the cavity of the mould, and operated substantially as described, for the purposes set forth.

In testimony whereof, we, the said J. S. ATTERBURY and T. B. ATTERBURY, have hereunto set our hands.

J. S. ATTERBURY.
T. B. ATTERBURY.

Witnesses:
A. PATTERSON,
JOHN O. STEVENSON.